July 9, 1968            J. T. SALIHI            3,392,316

MOTOR POWER SUPPLY SYSTEM INCLUDING A PULSE MODULATOR

Original Filed May 20, 1965            3 Sheets-Sheet 1

INVENTOR.
Jalal T. Salihi
BY C. R. Meland
HIS ATTORNEY

INVENTOR.
Jalal T. Salihi
BY C. R. Meland
HIS ATTORNEY

United States Patent Office 3,392,316
Patented July 9, 1968

3,392,316
MOTOR POWER SUPPLY SYSTEM INCLUDING A PULSE MODULATOR
Jalal T. Salihi, Birmingham, Mich., assignor to General Motors Corporation, Detroit, Mich., a corporation of Delaware
Continuation of application Ser. No. 457,374, May 20, 1965. This application Nov. 20, 1967, Ser. No. 684,115
8 Claims. (Cl. 318—227)

ABSTRACT OF THE DISCLOSURE

This invention relates to a pulse modulator for controlling the average direct current applied to the direct current input terminals of an inverter which feeds a polyphase induction motor. A controlled rectifier is connected in series between one terminal of the source of direct current and one direct current input terminal of the inverter. This controlled rectifier is switched on and off to control the average direct current applied to the inverter and the turn-off circuit for the controlled rectifier is capable under certain conditions of operation of feeding energy to the inverter.

---

This application is a continuation of copending application Ser. No. 457,374 filed on May 20, 1965, now abandoned.

This invention relates to a modulator which can be used to control the amount of power supplied to a three phase induction motor through an inverter.

One of the objects of this invention is to provide a modulator which has a direct current input and which is controlled by a trigger circuit to give a smooth variable direct current output by means of either pulse width control or pulse frequency control or a combination of both.

Another object of this invention is to provide a modulator that is capable of operating through a wide range of power levels.

A further object of this invention is to provide a controlled rectifier modulator that employs a double branch commutating circuit. Using the double branch commutating circuit makes the circuit operate reliably at all power levels. It also makes the spacing of trigger pulses uncritical such that almost full conduction angle may be obtained reliably. By using this double branch commutating circuit, it is also possible to reduce the power requirement of the controlled rectifiers that are used in the modulator.

A further object of this invention is to provide a modulator which is capable of providing pulse width control from a relatively simple trigger circuit.

Still another object of this invention is to provide a motor control system wherein the power supplied to the motor is controlled by a modulator that can be controlled either by pulse width control or pulse frequency control.

Another object of this invention is to provide a modulator that includes elements controlled by a pulse frequency control signal and wherein these elements are used to shut-off a controlled rectifier which is used for pulse width control.

Still another object of this invention is to provide a modulator wherein a controlled rectifier is connected between a source of direct current and a load and wherein this controlled rectifier is pulsed to provide a variable output and further wherein a double branch commutating circuit is provided for shutting off the controlled rectifier and for providing pulse frequency control.

Another object of this invention is to provide a power control system for an electric powered vehicle which includes a modulator that is capable of being controlled by pulse frequency control and pulse width control and wherein a control device such as an accelerator pedal determines whether or not the modulator is operating in the pulse frequency control mode or in the pulse width control mode. In carrying this object forward, the vehicle is preferably operated by pulse frequency control during initial acceleration but is shifted to pulse width control when the motor comes up to speed.

Further objects and advantages of the present invention will be apparent from the following description, reference being had to the accompanying drawings wherein preferred embodiments of the present invention are clearly shown.

Figure 1:
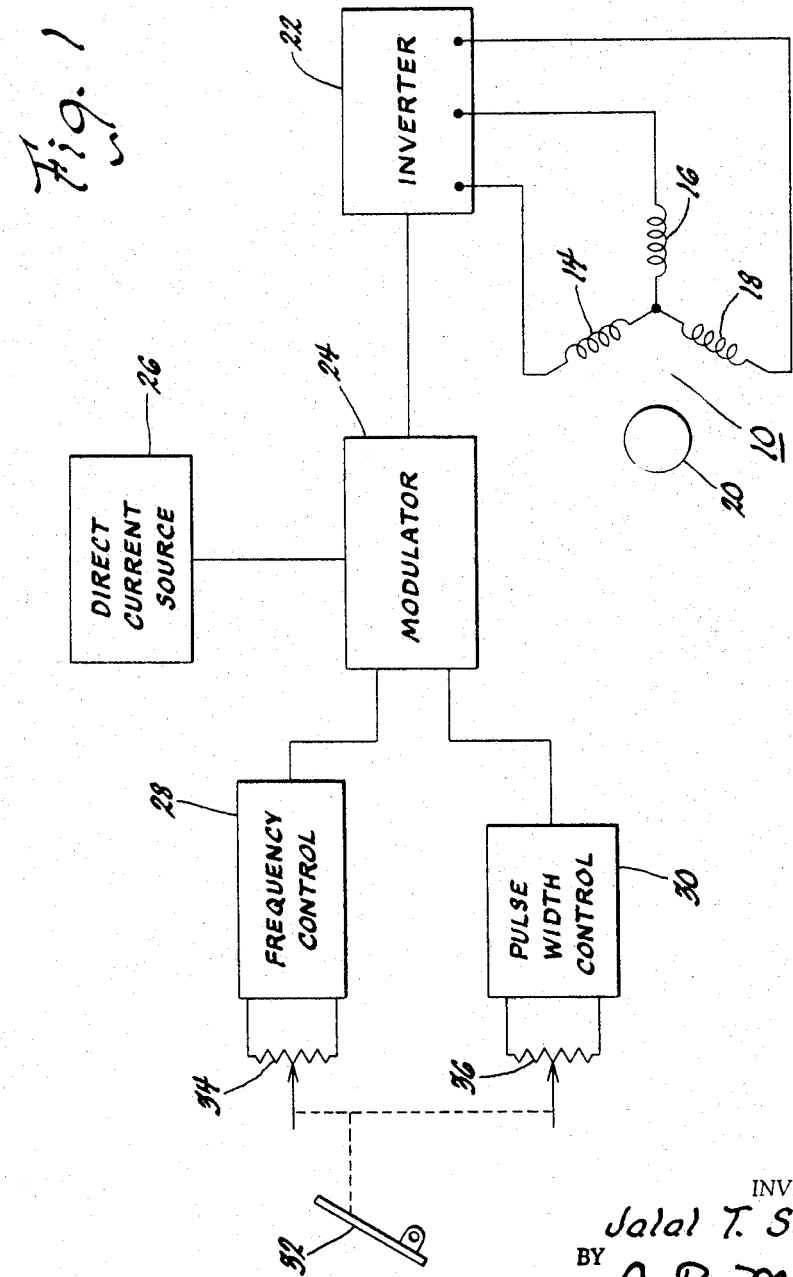
FIGURE 1 is a block diagram illustration of a motor control system that uses the modulator of this invention.

Referring now to the drawing and more particularly to FIGURE 1, the reference numeral 10 generally designates a three phase Y-connected induction motor having phase windings 14, 16, 18 and a rotor 20. The induction motor 10 is fed from a three phase inverter designated by reference numeral 22 which can be of various circuit configurations but preferably is of the type illustrated in patent application S.N. 457,367, filed on May 20, 1965 and assigned to the assignee of this invention.

Figure 2:
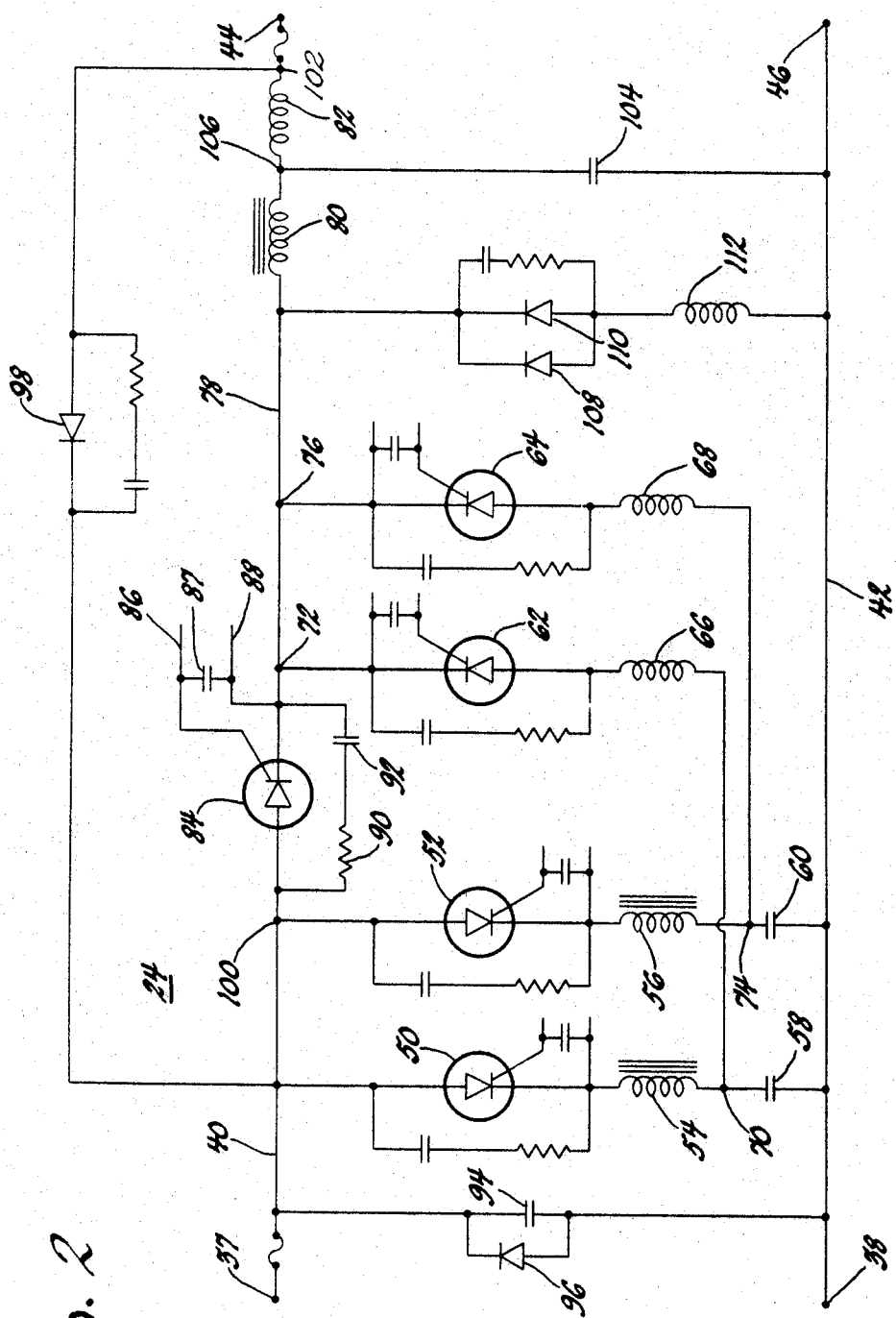
FIGURE 2 is a schematic circuit diagram of a modulator made in accordance with this invention.

The inverter 22 is fed by the modulator 24 of this invention which is illustrated in FIGURE 2. The modulator is connected with a source of direct current 26 and receives trigger information from a frequency control device 28 and a pulse width control device 30. Where the electric motor 10 is used as the source of motive power for a vehicle, the frequency control 28 and the pulse width control 30 are controlled by an accelerator pedal 32. The accelerator pedal 32 controls variable resistors 34 and 36 which in turn supply input information respectively to the frequency control 28 and the pulse width control 30.

It is preferred in applications where the motor 10 drives a vehicle such as a passenger car that the frequency control be used during initial acceleration of the motor and that the pulse width control be used following initial acceleration of the motor. This can be accomplished by providing a mechanical linkage or other means connected between the accelerator pedal 32 and the controls 34 and 36 such that the control 36 does not become effective until the control 34 is moved to one extreme position.

The frequency control 28 and the pulse width control 30 actually comprise a number of circuits which for purposes of simplification are not illustrated in FIGURE 1. The exact control, however, is disclosed in patent application S.N. 457,373, filed on May 20, 1965 and assigned to the assignee of this invention.

Referring now more particularly to FIGURE 2, the modulator 24 is illustrated. This modulator includes power input terminals 37 and 38 connected respectively with power input conductors 40 and 42. The input terminals 37 and 38 are connected across a source of direct current such as source 26. The modulator of FIGURE 2 has output terminals 44 and 46 which are connected with the inverter 22.

The modulator of FIGURE 2 includes controlled rectifiers 50 and 52 which are connected in series with the inductors 54 and 56. The inductors 54 and 56 are connected respectively with capacitors 58 and 60. The modulator includes controlled rectifiers 62 and 64. The anode of controlled rectifier 62 is connected with an inductance 66 whereas the anode of controlled rectifier 64 is connected with inductance 68. The series connected inductance 66 and controlled rectifier 62 are connected between junctions 70 and 72. The series connected inductance 68 and controlled rectifier 64 are connected between junctions 74 and 76. The junctions 72 and 76 are connected with a power output conductor 78. The power output conductor is connected with output terminal 44 through the inductors 80 and 82.

The modulator of FIGURE 2 has another controlled rectifier 84 having its anode connected with power input conductor 40 and its cathode connected with power output conductor 78. It is seen that the gate and cathode electrodes of controlled rectifier 84 are connected with conductors 86 and 88 and these conductors are connected by a capacitor 87. The conductors 86 and 88 form pulse input terminals for controlled rectifier 84 and it is seen that the other controlled rectifiers 50, 52, 62 and 64 have similar input terminals for applying triggering pulses respectively to the controlled rectifiers. The anode-cathode circuit of controlled rectifier 84 is shunted by a series connected resistor and capacitor 90 and 92. The other controlled rectifiers of the system have a series connected resistor and capacitor connected across the anode-cathode circuit as shown.

A capacitor 94 is connected across power supply conductors 40 and 42 and this capacitor is shunted by a diode 96.

A diode 98 connects the junctions 100 and 102. A capacitor 104 connects junction 106 with conductor 42. The conductors 78 and 42 are connected by diodes 108 and 110 through an inductor 112.

Figure 3:
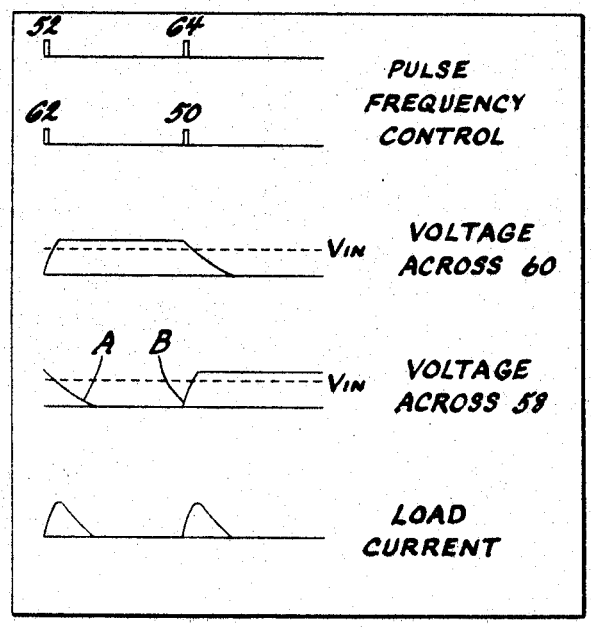
FIGURE 3 illustrates a series of pulse wave forms for various components of the systems illustrated in FIGURES 1 and 2.

The operation of the modulator illustrated in FIGURE 2 will now be described. The modulator of FIGURE 2 is triggered by the voltage pulses coming from the frequency control 28 and at times by the pulses coming from the pulse width control 30. FIGURE 3 illustrates the voltage pulses applied to the modulator 24 from the frequency control 28 and these pulses have been identified by the same reference numerals that are used in FIGURE 2 to identify the corresponding controlled rectifier that is triggered by these pulses. Thus the voltage pulse 52 shown in FIGURE 3 is applied across the gate and cathode electrodes of controlled rectifier 52 to turn it on. The same is true of voltage pulses 64, 62 and 50 which respectively trigger controlled rectifiers 64, 62 and 50 in the sequence illustrated in FIGURE 3. FIGURE 3 also illustrates the voltage developed across the capacitors 60 and 58 and also illustrates the load current during frequency control.

Assuming now that a control pulse 52 has been applied to the controlled rectifier 52, it will be turned on in its anode-cathode circuit and the capacitor 60 will be charged from the source of direct current through the inductance 56. The capacitor 50 will charge to a voltage higher than the voltage applied to conductors 40 and 42 as determined by the Q of the circuit. As a result of this charging of capacitor 60 through the inductance 56, the voltage of the cathode of controlled rectifier 52 will be raised sufficiently to turn off this controlled rectifier. The Q of the resonant circuit is determined by the values of lead inductance, inductance 56 and the capacitor 60.

The capacitor 60 will remain charged until the control pulse 64 is applied to controlled rectifier 64 to turn it on. When this happens, the capacitor 60 will discharge through inductance 68, controlled rectifier 64 and through the lead that is connected with output terminals 44 and 46.

In a similar fashion, capacitor 58 will be charged through inductance 54 when controlled rectifier 50 is triggered to a conductive condition. The capacitor 58 can discharge through the controlled rectifier 62, inductance 66 and through the load when controlled rectifier 62 is triggered to a conductive condition.

The controlled rectifiers 62 and 64 are sequentially turned off by the sequential discharge of capacitors 58 and 60. Thus, for example, when capacitor 58 has discharged through controlled rectifier 62, this controlled rectifier is turned off by the beginning of the discharge of capacitor 60 through controlled rectifier 64. This is important in this system because it is possible under reduced load conditions for the trailing edge A (FIGURE 3) of the discharge voltage across one of the capacitors to overlap the beginning B of the charging part of the cycle for the capacitor. If it were not for the double branch commutating circuit including controlled rectifiers 62 and 64, it might be possible to have the controlled rectifiers 50 and 62 turned on at the same time to provide a direct circuit between junctions 100 and 72. However, with the double branch circuit, the discharge of capacitor 60 through controlled rectifier 64 immediately turns off controlled rectifier 62 so that there is no possibility of making a direct connection between the input and output terminals of the modulator through two controlled rectifiers under light load conditions. This also applies to the two controlled rectifiers 52 and 64.

It will be appreciated that during frequency control, the output voltage supplied to the load is provided by the discharge of capacitors 58 and 60. It will also be appreciated that the amount of power supplied to the load can be controlled by varying the frequency of the pulses shown in FIGURE 3 that trigger the controlled rectifiers. This is true since the energy stored in the capacitor per cycle is fixed and therefore the power supplied to the load depends upon the number of discharges per second.

Figure 4:
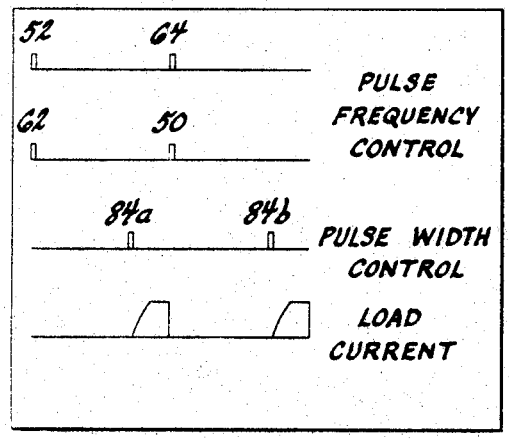
FIGURE 4 illustrates voltage wave forms of the modulator of this invention during pulse width control.
Figure 5:
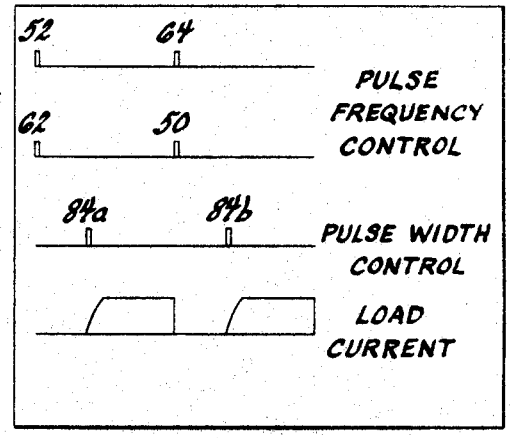
FIGURE 5 illustrates the same voltage wave forms as FIGURE 4 but shifted in time to illustrate the pulse width control of the modulator of this invention.

When it is desired to increase the power supplied to load, the pulse width control 30 is brought into operation to supply the triggering pulses 84a, and 84b illustrated in FIGURES 4 and 5 across the input conductors 86 and 88 of controlled rectifier 84. During pulse width control, the output from capacitors 58 and 60 is fixed at a frequency of, for example, 500 cycles per second. As the accelerator pedal is depressed, the output of the frequency control 28 increases up to 500 cycles per second whereupon the pulse width control 30 comes into operation to apply trigger pulses 84a and 84b to the controlled rectifier 84. As pointed out above, the controls 28 and 30 are fully disclosed in above-mentioned patent application S.N. 457,373.

During pulse width control, the relationship of the voltage pulses applied to the controlled rectifiers of the modulator shown in FIGURE 2 are illustrated in FIGURES 4 and 5. As mentioned above, the pulses applied to controlled rectifiers 50, 52, 62, and 64 will be at a constant frequency of approximately 500 cycles per second. When a pulse such as pulse 84a is applied to controlled rectifier 84, the pulse 84a will turn on the controlled rectifier 84 in its anode-cathode circuit and power can now be applied directly to the load from conductor 40, through the anode-cathode circuit of controlled rectifier 84, and through power supply conductor 78. The controlled rectifier 84 will remain conductive until pulse 64 takes place to trigger the controlled rectifier 64 and discharge the capacitor 60. The controlled rectifier 84 is turned off by the discharging of capacitor 60 through controlled rectifier 64. The amount of power supplied to the load will now be determined by the time-spaced relationship of pulses 84a and 64 as is depicted in FIGURE 4. It is seen from FIGURE 5 that when the pulses 84a and 84b occur earlier in the cycle, the space between pulses 84a and 64 is increased to increase the load current supplied to the load. This provides pulse width control by varying the time that the pulses 84a and 84b occur in relationship to the control pulses 62 and 64.

In the mode of operation just described, the frequency of pulses 52, 64, 62 and 50 and the frequency of pulses 84a and 84b have been held at a fixed value. This can be accomplished by the trigger circuit disclosed in co-pending patent application S.N. 457,373. It will be appreciated, however, that the modulator of FIGURE 2 can be controlled to provide frequency control, pulse width control or a combination of both by trigger circuits other than the one illustrated in application S.N. 457,373.

The function of the diode 98 is to limit the maximum output voltage of the modulator and provides a path for discharging the inductances 80, 82 and 112 during faulty operation as, for example, the failure of a fuse or a heavy transient.

The diode 96 provides a path for the discharge of inductances 54 and 56 during a faulty operation such as the failure of a fuse or heavy transient. The capacitor 92 and the resistor 90 are for high voltage spike suppression and their counterparts are connected across various components in the circuit. The diodes 108 and 110 are used as free wheeling diodes in the system.

Although the modulator has been illustrated for supplying power to an induction motor through an inverter, it will be appreciated by those skilled in the art that it may be used to supply other types of loads. Thus, the modulator can be used to supply a direct current motor, a resistive load, or an inductive load. The output of the modulator can be provided with a suitable filter and the design of this filter depends upon the load to be supplied. In the system of FIGURE 1, a filter can be provided that includes two inductances connected in series with one of the output terminals of the modulator and a capacitor connected between a junction of the inductances and the opposite output terminal.

While the embodiments of the present invention as herein disclosed constitute a preferred form, it is to be understood that other forms might be adopted.

What is claimed is as follows:

1. A motor control system comprising, a source of electrical power, an electric motor, a modulator connected between said source of power and said motor, said modulator having input terminals connected across said source of power, and output terminals connected with said motor, a controlled rectifier connected in series between one of said input terminals and one of said output terminals of said modulator, said controlled rectifier when conductive being operative to connect said source of power and said motor, triggering means for periodically driving said controlled rectifier to a conductive condition, a pulse forming network connected across the input and output terminals of said modulator in shunt with said controlled rectifier, said pulse forming network receiving electrical energy from said source of electrical power and discharging electrical energy into said motor through said output terminals, and means for controlling the frequency of operation of said pulse forming network, said pulse forming network being operative to supply electrical energy to said motor when said triggering means for said controlled rectifier is not operating and being operative to supply turn-off signals for said controlled rectifier when said triggering means is in operation to trigger said controlled rectifier to a conductive condition.

2. A motor control system comprising, a source of electrical power, a motor, a modulator connected between said source of power and said motor, said modulator having input terminals connected with said source of power and output terminals connected with said motor, a semiconductor switching device connected between one of said input terminals and one of said output terminals, a pulse forming control means connected across said input terminals and output terminals for supplying turn-off voltage pulses to said semiconductor switch means, and means for controlling the operation of said semiconductor switch means and said pulse forming control means, said last-named means being operative to cause energy to be supplied to said motor solely from said pulse forming control means under certain conditions of operation and being operative to cause energy to be supplied to said motor through said semiconductor switch means under other conditions of operation.

3. The motor control system according to claim 2 where the modulator is connected with the motor through an inverter.

4. The motor control system according to claim 2 where the motor is a three phase Y-connected induction motor and where the modulator is connected to the motor through an inverter.

5. A motor control system for an induction motor comprising, a source of direct current, an inverter having input and output terminals, a polyphase induction motor having a polyphase winding, means connecting the output terminals of said inverter with said polyphase winding, a voltage control network having an input and an output, means connecting said input of said voltage control network with said source of direct current, a filter connecting the output of said voltage control network with said input of said inverter, said voltage control network including first and second switching circuits connecting said source of direct current and the input terminals of said inverter and a control means connected with said first and second switching circuits for controlling the operation of said first and second switching circuits, said control means including means for operating said first switching circuit at a fixed pulse width and variable pulse frequency over a first range of control to initially accelerate said induction motor from a stall condition, said control means including means for operating said second switching circuit at a fixed frequency and variable pulse width over a second range of control following the acceleration of said motor by said first switching means.

6. A motor control system for a polyphase induction motor comprising, a source of direct current, a polyphase induction motor having a polyphase winding, an inverter having input and output terminals, means connecting the output terminals of said inverter with said polyphase winding, a voltage control network having an input and an output, means connecting the input of said voltage control network with said source of direct current, a filter connecting the output of said voltage control network with said input terminals of said inverter, said voltage control network including a controlled rectifier having an anode connected with said source of direct current and a cathode connected with said filter, said voltage control network including a pulse forming network connected between said source of direct current and said filter and across the anode and cathode of said controlled rectifier, said pulse forming network operative to apply voltage pulses to said filter and the cathode of said controlled rectifier, and a manually operable control device coupled to the gate of said controlled rectifier and to said pulse forming network, said manually operable control device having first and second operating ranges, said manually operable control device operating said pulse forming network to supply energy to said polyphase motor winding to initially accelerate said motor while maintaining said controlled rectifier nonconductive when said manually operable control device is in said first operating range, said manually operable control device gating said controlled rectifier conductive and said pulse forming network providing turn-off voltage pulses for said controlled rectifier when said manually operable control device is in said second operating range.

7. An electric drive system comprising, a source of direct current, a polyphase induction motor having a polyphase winding, an inverter having input and output terminals, means connecting the output terminals of said inverter and said polyphase winding of said motor, a voltage control circuit connected between said source of direct current and said input terminals of said inverter, said voltage control circuit including switching means connected between said source of direct current and said input terminals of said inverter, a manually operable control means having a first and second range of control, means coupled to said manually operable control means and to said switching means for operating said switching means to provide variable frequency voltage pulses to said inverter when said manually operable control means is in its first range of control, said manually operable control means in said first range of control accelerating said induction motor from a stall condition, means coupled to said manually operable control means and to said switching means for operating said switching means to provide fixed frequency and variable pulse width voltage pulses to said inverter when said manually operable control device is in its second range of control, and a filter connected between the output of said voltage control circuit and said input of said inverter.

8. An electric drive system for providing motive power to a vehicle comprising, a source of direct current, a polyphase induction motor having a rotor and a polyphase winding, a polyphase inverter having input and output terminals, a voltage control network having an input and an output, means connecting said input of said voltage control network with said source of direct current, a filter connecting said output of said voltage control network and said input of said inverter, said voltage control network including switching means connected between said input and output of said voltage control network, a manually operable control means for controlling the average voltage applied to said input of said inverter from said source of direct current, said manually operable control means having a first range of control for accelerating said motor from a stall condition and a second range of control, means coupled to said manually operable control means and to said switching means for operating said switching means in a variable frequency mode of operation when said manually operable control means is in its first range of control, and means coupled to said manually operable control means and to said switching means for operating said switching means in a variable pulse width mode of operation when said manually operable control means is in said second range of control.

References Cited

UNITED STATES PATENTS 3,287,062  11/1966  Dannettell.

ORIS L. RADER, *Primary Examiner.*

G. RUBINSON, *Assistant Examiner.*